United States Patent
Oakes, III et al.

(10) Patent No.: US 9,721,400 B1
(45) Date of Patent: Aug. 1, 2017

(54) DETECTING MOTOR VEHICLE DAMAGE

(71) Applicant: United Services Automobile Association, San Antonio, TX (US)

(72) Inventors: Charles L. Oakes, III, Boerne, TX (US); Rickey D. Burks, Boerne, TX (US); Michael P. Bueche, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 14/925,422

(22) Filed: Oct. 28, 2015

Related U.S. Application Data (60) Provisional application No. 62/072,834, filed on Oct. 30, 2014.

(51) Int. Cl.
*G07G 5/00* (2006.01)
*G06Q 10/00* (2012.01)
*G07C 5/08* (2006.01)
*G07C 5/00* (2006.01)

(52) U.S. Cl.
CPC .......... *G07C 5/0808* (2013.01); *G07C 5/008* (2013.01); *G07C 5/085* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,708,104 | B2* | 3/2004 | Avery, Jr. | F01N 3/023 701/108 |
| 7,712,367 | B2* | 5/2010 | Eckert | G01M 13/04 73/593 |
| 8,036,788 | B2* | 10/2011 | Breed | G07C 5/008 701/31.9 |
| 9,272,706 | B2* | 3/2016 | Martin | B60W 10/06 |
| 2008/0255887 | A1* | 10/2008 | Gruter | G06Q 40/08 705/4 |
| 2008/0271942 | A1* | 11/2008 | Yamashita | B62D 5/04 180/443 |
| 2012/0076437 | A1* | 3/2012 | King | G06Q 10/10 382/286 |
| 2012/0083959 | A1* | 4/2012 | Dolgov | G05D 1/0214 701/23 |
| 2013/0096787 | A1* | 4/2013 | Holub | F16H 61/12 701/54 |
| 2015/0348058 | A1* | 12/2015 | Liu | G06Q 30/0201 705/14.49 |

* cited by examiner

*Primary Examiner* — Yonel Beaulieu
(74) *Attorney, Agent, or Firm* — Baker Hostetler LLP (57) ABSTRACT

A method and system for detecting motor vehicle damage is described which includes a sensor to detect damage to a motor vehicle component from a plurality of motor vehicle components. A network interface is provided to transmit an indication of the detected damage, the indication including an identifier associated with the damaged motor vehicle component. Also provided is a data store to store the indication of the detected damage.

20 Claims, 3 Drawing Sheets

DETECTING MOTOR VEHICLE DAMAGE

CROSS REFERENCE TO RELATED APPLICATIONS

This application claims priority to U.S. Patent Application Ser. No. 62/072,834 filed Oct. 30, 2014 which is incorporated herein by reference in its entirety.

FIELD OF THE INVENTION

The disclosed embodiments relates to a system, method and process for detecting motor vehicle damage.

BACKGROUND OF THE INVENTION

Motor vehicles are complex devices that include a variety of components to provide various functions and/or desired motor vehicle configurations. The components may be subject to damage, for instance, damage incurred as a result of a collision. It may be desirable to repair the components, such as damaged components, in an effort to provide the various functions and/or the desired motor vehicle configuration.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a method and system for detecting motor vehicle damage is described which includes a sensor to detect damage to a motor vehicle component from a plurality of motor vehicle components. A network interface is provided to transmit an indication of the detected damage, the indication including an identifier associated with the damaged motor vehicle component. Also provided is a data store to store the indication of the detected damage.

BRIEF DESCRIPTION OF THE DRAWINGS

The accompanying drawings illustrate various non-limiting, exemplary, inventive aspects in accordance with the present disclosure.

DETAILED DESCRIPTION OF CERTAIN EMBODIMENTS

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

The publications discussed herein are provided solely for their disclosure prior to the filing date of the present application. Nothing herein is to be construed as an admission that the illustrated embodiments are not entitled to antedate such publication by virtue of prior invention. Further, the dates of publication provided may differ from the actual publication dates which may need to be independently confirmed.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety.

Motor vehicles refer to motorized vehicles capable of self-propulsion including, for example, automobiles, motorcycles, boats, recreational vehicles, etc. Motor vehicles include motor vehicle components. Motor vehicle components refer to constituent parts of a motor vehicle, such as doors, fenders, engines, computer panels, etc., that provide a function and/or a desired configuration (e.g., an aesthetically desirable configuration) of the motor vehicle. The motor vehicle components can be located on an interior and/or on an exterior of the motor vehicle. The motor vehicle component can be included in and/or comprise a mechanical systems of the motor vehicle, for example, a drive train, and engine (e.g., a component of an engine), a blinker, a headlight, a tire, among other mechanical systems that can perform a mechanical function to enable the motor vehicle to operate/perform as intended. The motor vehicle components can be made of steel, metal alloys, electronics, composite materials (e.g., plastics, resins, etc.), among other materials and/or combinations of materials.

It can be desirable to alter the motor vehicle components of a motor vehicle to provide a given function and/or motor vehicle configuration. Altering can include replacement of a motor vehicle component and/or addition of additional motor vehicle components to the motor vehicle, among other alterations. For example, it may be desirable to replace a damaged motor vehicle component. Damage can occur in a variety of ways such as exposure to environmental elements (e.g., light, heat, hail, etc.) and/or as a result of a force applied to the motor vehicle/motor vehicle component (e.g., resultant forces from an automobile accident), among other ways. Depending on an amount of damage sustained, a damaged motor vehicle component may be a candidate for replacement. For instance, it may be desirable to replace a damaged motor vehicle component in effort to continue to provide a function and/or a desired motor vehicle configuration.

Readily detecting such damage can be desirable. For example, efficient (e.g., timely) detection of damage can provide comparatively faster alteration (e.g. replacement) of damaged motor vehicle components and/or expedite transactions, such as financial transactions, associated with alteration of the damaged motor vehicle component.

Advantageously, the present disclosure provides methods, systems, and computer-readable and executable instructions for detecting damage. Detecting damage, in accordance with one or more embodiments, can include detecting an amount of damage to a motor vehicle component (e.g., a damaged motor vehicle component) of the motor vehicle. For example, damage can be detected by a sensor, such as those described herein.

The embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. As used herein, "a" or "a number of" something can refer to one or more such things. For example, "a number of objects" can refer to one or more objects.

Figure 1:
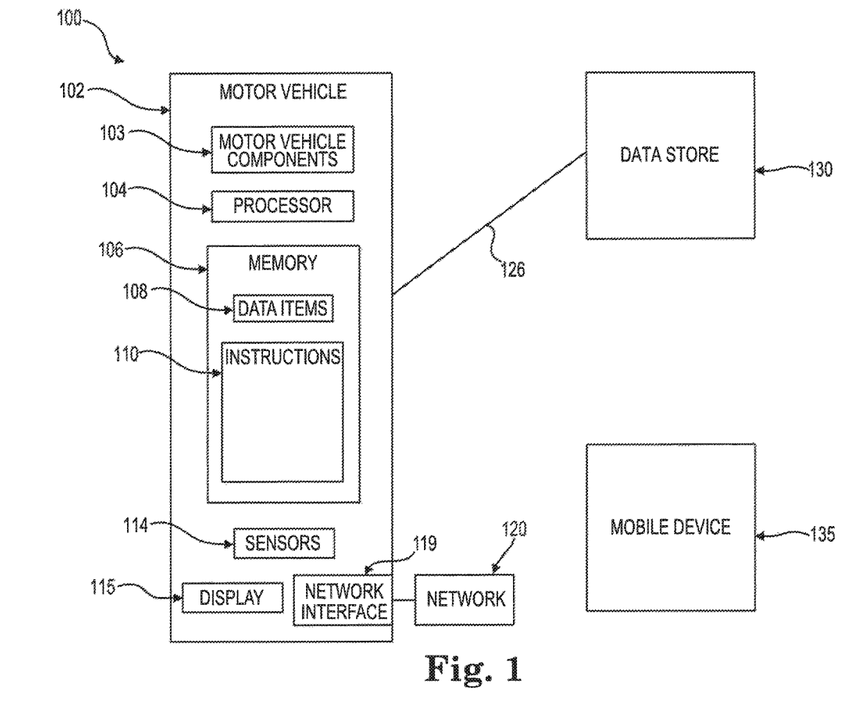
FIG. 1 illustrates an example of a system for detecting damage components according to one or more embodiments of the present disclosure.

FIG. 1 illustrates an example of a system for detecting damage according to one or more embodiments of the present disclosure. As illustrated in FIG. 1, the system 100 can be provided for detecting damage to motor vehicle components.

The system 100 can include a motor vehicle 102. Motor vehicles refer to motorized vehicles capable of self-propulsion including, for example, automobiles, motorcycles, boats, recreational vehicles, etc.

The motor vehicle can include a plurality of motor vehicle components 103. Motor vehicle components 103 refer to constituent parts of a motor vehicle, such as doors, fenders, engines, computer panels, etc., that provide a function and/or a desired configuration (e.g., an aesthetically desirable configuration) of the motor vehicle. The motor vehicle components 103 can be located on an interior and/or on an exterior of the motor vehicle 102. The motor vehicle components 103 can be made of steel, metal alloys, electronics, composite materials (e.g., plastics, resins, etc.), among other materials and/or combinations of materials.

The motor vehicle 102 can include a processor 104 and a memory 106. Memory 106 can be any type of storage medium that can be accessed by the processor 104 to perform various embodiments of the present disclosure (e.g., provide an indication of an amount of damage to a motor vehicle component, etc.). For example, memory 106 can be a non-transitory machine readable medium having machine readable instructions 110 (e.g., generating machine program instructions, machine readable instructions, computer readable instructions, etc.) and data items 108 stored thereon. Memory 106 can be volatile or nonvolatile memory. Memory 106 can also be removable (e.g., portable) memory, or non-removable (e.g., internal) memory. For example, memory 106 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

The memory 106 can include machine readable instructions 110 capable of being executed by the processor 104 to carry out the functions as described herein. In some embodiments, some or all of the functions are carried out via hardware in lieu of a processor-based system. Further, although memory 106 is illustrated as being located in the motor vehicle 102, embodiments of the present disclosure are not so limited. For example, memory 106 can, in addition to the memory located in the motor vehicle 102 or alternatively, memory 106 can be located internally within another computing resource (e.g., enabling computer readable instructions to be downloaded over the Internet or another wired or wireless connection).

The processor 104 executes instructions, such as machine readable instructions 110, and can, in some generating machines, be utilized to control the operation of an entire generating machine (such as those described herein) and/or control the plurality of sensors 114, among others machines and/or components (e.g., components included in the motor vehicle 102). The processor 104 can include a control unit that organizes data and program storage in memory and transfers data and/or other information between the various portions of the motor vehicle 102, a generating machine, as described herein, and/or other electronic devices. Although the motor vehicle 102 is shown to contain a single processor 104, the disclosed embodiment also applies to devices that may have multiple processors with some or all performing different functions and/or in different ways. The machine readable instructions 110 can, for example, include a number of programs such as the applications (e.g., software objects and/or modules, among others). The data items 108, such as information associated with a motor vehicle component and/or an electronic model, can be used (e.g., analyzed by) the machine readable instructions 110 during their execution.

The motor vehicle 102 can include a plurality of sensors 114. Sensors refer to devices that can detect sensory input. Sensors can include, for example, accelerometers (e.g., an accelerometer detecting a sudden decrease in velocity of the motor vehicle 102), airbag deployment sensors (e.g., sensors that detect deployment of an airbag), visual sensors, such as those described herein, material sensors (e.g., nano-material detection sensors), and/or electromagnetic frequency (EMF) sensors, among other types of sensors. The present subject matter is not limited to any particular type of sensor, as various sensors may be used as a sensor of the plurality of sensors 114 and are considered within the scope of the present subject matter. In some embodiments, a sensor of the plurality of sensors 114 can detect an EMF change associated with the motor vehicle component to detect damage (e.g., damage to the motor vehicle component). A change in EMF of a particular motor vehicle component (e.g., compared to a baseline EMF of the particular motor vehicle component) can indicate that damage has occurred, for instance, damage to the motor vehicle component has altered its shape and/or EMF frequency.

Additionally, while the plurality of sensors 114 are illustrated in FIG. 1 as being located within the motor vehicle 102 the present disclosure is not so limited. That is, an object and/or an environment external to the motor vehicle can include some or all of the plurality of sensors 114. For example, an external environment, such a building housing in which the motor vehicle 102 can be positioned can include some or all of the plurality of sensors. Such an external environment may enable the plurality of sensors 114) to readily detect damage to the motor vehicle. For example, the plurality of sensors can detect visual changes to one or more of the plurality of motor vehicle components 103 of the motor vehicle 102.

Such detection of visual changes can, in some embodiments, be performed by detection of a change in a distance between two or more focal points, for instance, focal points located on a motor vehicle. The change in focal points can occur between two or more focal points located on a particular motor vehicle component and/or between two or more focal points located on two or more respective motor vehicle components of the motor vehicle 102. For example, a change in a distance between a front bumper and a rear bumper of the motor vehicle can be detected and/or a change in a size/shape of a particular motor vehicle component of the plurality of motor vehicle components can be detected, among other ways to detect damage to the motor vehicle components 103.

In some embodiments, a sensor of the plurality of sensors 114 can detect an EMF change to a motor vehicle component to detect the damage. For example, a sensor can detect a baseline EMF frequency of a given motor vehicle component. Such a motor vehicle component can become damaged (e.g., damaged through impact therewith) and may thus have a different EMF frequency detectable by the sensor as a result of damage (e.g., a change in shape and/or dimensions of the motor vehicle component).

In various embodiments, information associated a plurality of motor vehicle components, among other information, can be stored in a data store 130. Data store can include memory as described herein and/or a database, among other suitable types of storage. In some embodiments, the data store 130 can be located within a motor vehicle, such as motor vehicle 102. A data store located in a motor vehicle 102 can, for example, include information associated with some (e.g., exterior components) or all of the motor vehicle components (e.g., all exterior and interior motor components) of the motor vehicle 102.

The data store 130 can, in some embodiments, include information associated with all motor vehicle components that do not include electronics embedded therein. In some embodiments, the data store 130 can include information associated with a component indicated as a damaged component. In some embodiments, the data store 130 can be located within the motor vehicle 102 and/or can include respective information to generate each of a plurality of motor vehicle components (e.g., external components and/or internal components) included in a motor vehicle 102. For example, in some embodiments, the data store 130 can be located within a motor vehicle, such as motor vehicle 102, that can include a motor vehicle component indicated as damaged, as described herein.

While the data store 130 can be located within a motor vehicle 102, the present disclosure is not so limited. For example, the data store 130 can be located at a shop (e.g., a repair shop capable of replacing a damaged motor vehicle component with a generated motor vehicle component) and/or a location associated with an insurance provider (e.g., an insurance provider of the motor vehicle 102), among other locations. In some embodiments, the data store 130 can be located a separate and distinct location from a motor vehicle 102 at a time of generation of a motor vehicle component (e.g., a 3D copy of a motor vehicle component). Advantageously, this can enable generation of the motor vehicle component by a number of possible entities including those located at a separate and distinct location from the motor vehicle and/or a shop scheduled to receive a motor vehicle component following generation of the motor vehicle component, among other advantages. For instance, in some embodiments, the data store 130 can include an electronic model of a motor vehicle component indicated as damaged.

Additional, advantages can be realized by utilization of a data store that can include information to generate components for a plurality of types (e.g., makes) of motor vehicles. For example, a data store(s) at a location associated with an insurance provider can include information associated with generating components for a plurality of types of vehicles the insurance provider provides insurance to. That is, in some embodiments, the data store 130 can be located, external to the motor vehicle 102, for instance, at a location associated with an insurance provider providing insurance to the motor vehicle 102.

The system 100 can, in some embodiments, include a generating machine (not shown). A generating machine refers to a machine that includes generating elements (not shown), among other elements (e.g., memory, etc.). Generating elements can be any suitable device/combination of devices to generate motor vehicle components. For example, generating elements can, in some embodiments, generate a motor vehicle component using additive manufacturing.

Additive manufacturing refers to addition of successive layers of material (e.g., layers having various shapes/specifications) to achieve a desired end product, such as a particular motor vehicle component. However, the present disclosure is not so limited. That is, the generating machine can generate the motor vehicle component using various extrusion manufacturing techniques (e.g., melting, ejection, solidification, etc.), rapid prototyping, freeform fabrication, and/or subtractive manufacturing (e.g., drilling, plasma/laser cutting, etc.), among other techniques suitable to generate motor vehicle components. In some embodiments, the generating machine can be at separate and distinct location from the motor vehicle at a time of generation of a motor vehicle component.

In various embodiments, the generating machine can generate a motor vehicle component based on the information associated with the motor vehicle component. For example, the generating machine can generate a three dimensional (3D) copy of a motor vehicle component). As used herein, a 3D copy of motor vehicle component refers to a 3D physical duplicate of an original motor vehicle component (e.g., a damaged motor vehicle component installed on a motor vehicle prior to incurring damage) having identical (e.g., substantially similar) specifications (e.g., height, width, length, radius, volume, etc.) as those of the original motor vehicle component. For example, the specifications of the original motor vehicle component can be identical to those of the copy of the motor vehicle component when accounting for manufacturing tolerances in the generation of the copy of the motor vehicle component and/or production of the original motor vehicle component. The motor vehicle component (e.g., the 3D copy of the motor vehicle component) can be generated using an electronic model (e.g., a respective electronic model associated with the motor vehicle component). The electronic model can be created based on information associated with the motor vehicle component, as described herein.

The information associated with the motor vehicle component can include a manufacturer OEM or non-OEM), an identifier of the motor vehicle component (e.g., a motor vehicle component number), an expected life (e.g., an average duration of useful life of a motor vehicle component), a status (e.g., current status) of the motor vehicle component, a type of material, specifications, an indicator of a presence of electronics embedded within the motor vehicle component, among other information that can be associated with the motor vehicle component. For example, in some embodiments, a data store can include respective information identifying a manufacturer of each of the plurality of motor vehicle components included in the motor vehicle. In some embodiments, an identifier of the motor vehicle component can correspond to a particular electronic model, for example, an electronic model to generate a copy of the motor vehicle component corresponding to the identifier, stored in a data store (e.g., data store 130).

In some examples, a manufacturer (e.g., OEM or non-OEM) of a motor vehicle component can be displayed. For example, a manufacturer of each of a plurality of motor vehicle components included a particular motor vehicle (e.g., motor vehicle 102) can be displayed. The display can include a total number of OEM motor vehicle components (e.g., a percentage of OEM motor vehicle components) and/or a total number of non-OEM (e.g., a percentage of non-OEM motor vehicle components), among other information. Such a display can occur at a display within the particular motor vehicle and/or at a display external to the motor vehicle, such as those described herein. Displaying the manufacturer for the motor vehicle component and/or each of the plurality of motor vehicle components can readily enable a user to identifying a information such as a total number of OEM components in a motor vehicle and/or promote generating motor vehicle components.

Information associated with the motor vehicle component, such as specifications of the motor vehicle component, can be used to create a 3D electronic model of the motor vehicle component. A 3D electronic model refers to a mathematical representation of a motor vehicle component based on information associated with a motor vehicle component. The mathematical representation can include a collection of points in a 3D space that can be connected by various geometric connectors. Such geometric connectors can include, for example, triangles, lines, and curved surfaces, among other geometric connectors. That is, 3D electronic models can include solid models and/or shell models, among other types of electronic models. Solid models refer to electronic models that define a volume of the motor vehicle component they represent. Solid models can be formed, fair example, using constructive solid geometry, among other techniques. Shell models refer to electronic models of a surface (e.g., a boundary) of a motor vehicle component they represent.

Electronic models can be created manually and/or automatically (e.g. through use of procedural modeling and/or based on a scan of a motor vehicle component). For example, an electronic model can be created automatically based upon a two dimensional image (e.g., a photo) using triangulation, approximation, and/or other suitable mathematic techniques to create an electronic model therefrom.

The motor vehicle 102 can include a display 115 and/or the generating machine can include a display (not shown). The display can be included in the generating machine, or connected thereto, to display information (e.g., to a user of generating machine). Similarly, the display can be included in the motor vehicle 102, or connected thereto, to display information (e.g., to a user of the motor vehicle). A display can include a screen, for example, a graphical user interface (GUI) that can provide (e.g., display and/or present) information to a user of generating machine. For example, the display can be used to display a GUI to digitally represent information and/or receive an input provided via the display (e.g., via a user interface). The display may be for example, a liquid crystal display (LCD), however, any appropriate display device and/or screen may be used. Further, generating machine can include any number of display's.

A display (e.g., display 115) can, in some embodiments, provide an indication of an expected life time of a motor vehicle component. In some embodiments, the display can provide a simultaneous display of a plurality of electronic representations indicative of respective expected life times for each of the plurality of motor vehicle components. Such as display can enable readily identifying component of the plurality of motor vehicle components that are within a threshold amount of time of satisfying the expected life and/or motor vehicle components that have exceeded their expected life. Readily identifying such motor vehicle components can promote generating motor vehicle components as described herein.

An indication refers to a visual, auditory, or other sensory output that can provide an indication of various pieces of information. The information can, in some embodiments include, information indicative of when an indication of damage to a motor vehicle component is received, an indication of initiation of generation of a motor vehicle component, indicative of an expected life of a motor vehicle component of the plurality of motor vehicle components, and/or an indication of completion of generation of a motor vehicle component, among other indications.

In some embodiments, the indication of the detected damage includes a total loss status of the motor vehicle. A total loss refers to a determination (e.g., a determination based upon the inventory/status information stored in the data store) that a cost associated with repair/replacement (e.g., of each damaged component of the plurality of components) meets or exceeds a threshold value (e.g. a value of an insurance policy covering the motor vehicle having the indication of damage). For example, a ratio of an amount of damage (e.g., a sum value associated with repair of the damage to and/or replacement of each the damaged motor vehicle components included in the motor vehicle) to a total value of the motor vehicle 102 can be determined. If such a ratio meets and/or exceeds a predetermined ratio than the motor vehicle can be determined to be a total loss. Readily determining a total loss can enable comparatively quick payment to policy holders (e.g., those who own a policy covering a motor vehicle determined to be a total loss) and/or promote quick resolution of insurance claims (e.g., delivering a motor vehicle determined not to be a total loss to a repair facility to enable repair thereof relatively quickly).

Additionally, the motor vehicle 102 and/or the generating machine can receive information from the user of generating machine through an interaction with the user via a display. For instance, the generating machine can receive an input from the user via display (e.g., a touch screen display or via another user input device such as a keyboard in response to interaction with items show on the display). For example, a user can enter the input into the generating machine using a mouse and/or keyboard associated with the generating machine (e.g., a display). Such an input can, for example, include a request to generate a motor vehicle component.

The motor vehicle 102 and/or the generating machine can include a network interface 119. The network interface 119 can, for example, include a receiver and/or a transceiver (e.g., wired and/or wireless), among other components suitable for communication with a network (e.g., a mobile communications network). The network interface 119 can transmit an indication of detected damage (e.g., an amount of damage), for instance, to a mobile device and/or a data store, among other locations to promote detecting damage.

The network interface 119 can connect the motor vehicle 102 and/or the generating machine to a network 120. Network 120 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 120) can provide a communication system that directly or indirectly links computers and/or peripheral devices and allows users to access resources on other computing resources (e.g., generating machines and/or data stores, etc.) and/or exchange messages with other users.

The network 120 can allow users to share resources on their own systems with other network users and to access information on centrally located systems or on systems that are located at remote locations. For example, the network 120 can permit communication with a mobile device, such as mobile device 135. Similarly, the network 120 can permit a generating machine to generate motor vehicle components at a location that is separate and distinct from an intended destination of the generated motor vehicle component and/or from a data store storing information associated with a motor vehicle component to be generated.

The network 120 may provide connections to the Internet and/or to the networks of other entities (e.g., organizations, institutions, etc.). Users may interact with network-enabled generating machine applications to make a network request, such as to get a file (e.g., a file including 3D electronic model of a motor vehicle component) or a request to generate a particular motor vehicle component. Such a network-enable generating machine applications can also communicate with network management software, which can interact with network hardware to transmit information between devices on the network.

A motor vehicle 102, such as those described herein, can be coupled directly (e.g., via a cord) and/or indirectly (e.g., wirelessly) to the generating machine, the data store 130, and/or a mobile device 135. A mobile device, as used herein, can include a mobile telephone, a tablet, a mobile personal computer, and/or a personal digital assistant (PDA), among other mobile devices. For example, mobile device 135 can, in some embodiments, be coupled via a wire and/or wirelessly (e.g., via link 126) to a transceiver included in the generating machine to receive information (e.g., a 3D electronic model) via the transceiver from a data store, such as data store 130. That is, although FIG. 1 illustrates a single data store external from the motor vehicle 102 the present disclosure is not so limited. The data store 130 can include a number of data stores at a number of locations, for example, included within the generating machine, a shop, a motor vehicle 102, and/or at a location associated with an insurance provider, among other locations suitable for generating motor vehicle components, as described herein.

Figure 2:
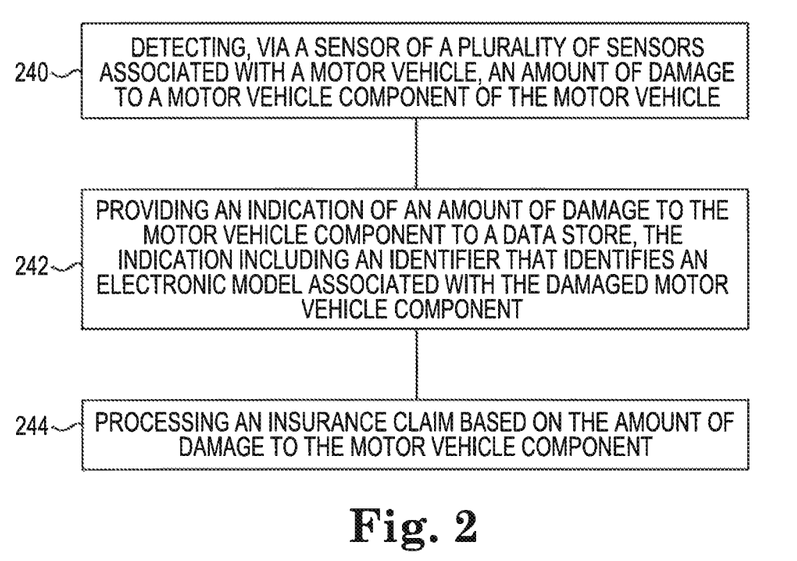
FIG. 2 illustrates a block diagram illustrating an example of a method to detect damage according to one or more embodiments of the present disclosure.

FIG. 2 illustrates a block diagram of an example of a method to detect damage according to one or more embodiments of the present disclosure. In various embodiments, the method can include detecting, via a sensor of a plurality of sensors associated with a motor vehicle, an amount of damage to a motor vehicle component of the motor vehicle, as shown at block 240. Detecting can include executing instructions stored in memory (e.g., memory 106) to detect an amount of damage to a motor vehicle component of the motor vehicle. Similarly, blocks 242 and 244 can include executing instructions stored in memory to perform the examples of the method described therein. Such a plurality of sensors, motor vehicle component, and/or motor vehicle can be analogous or similar to the plurality of sensors, motor vehicle component, and/or motor vehicle as described with respect to FIG. 1. Similarly, the data store, among others, can be analogous or similar to the data store 130 described with respect to FIG. 1.

In some embodiments the method for detecting damage can include displaying the indication of the amount of damage to the motor vehicle component. For instance, the displaying can occur via, a display, such as the display described with respect to FIG. 1.

In some embodiments, displaying can include displaying a total loss status. The total loss status refers to a determination (e.g., a current determination) of whether the motor vehicle 102 is a total loss. A particular color, symbol, letter, collection of letters, among other possible displays can be provided via a display to indicate a total loss status. For example, a "no" display could indicate the total loss status is not present. Similarly, a "yes" display could indicate the total loss status is present. Such a display, can readily enable an individual to determine a proper course of action regarding the motor vehicle. For instance, whether the motor vehicle 102 should be repaired/replaced when the total loss status is not present or treated otherwise when the total loss status is present (e.g., subdivided into constituent parts which may be resold).

In some embodiments, an electronic model can be created, as described herein, from information associated with a motor vehicle component, as described herein. For instance, as shown at block 242, in various embodiments, the method can include providing an indication of an amount of damage to the motor vehicle component to a data store, the indication including an identifier associated with the damaged motor vehicle component. In some embodiments, creating the electronic model can include creating the electronic model based upon specifications, as described herein, associated with the motor vehicle component.

In various embodiments, the method can include processing (e.g., automatically processing) an insurance claim, as described herein, based on the amount of damage to the motor vehicle component, as shown at block 244. In some embodiments, the method can include receiving an indication of damage to a motor vehicle component included in a motor vehicle. Such an indication, can in some embodiments, cause the generation of a motor vehicle component (e.g., generation of a 3D copy of the motor vehicle component indicated as damaged). In some embodiments, the method can include displaying an expected life, as described herein, of the generated motor vehicle component.

In some embodiments, the method can include altering a motor vehicle with the generated motor vehicle component. Such alterations can be performed manually, for example, manually based upon a procedure associated with the generated motor vehicle component and/or automatically (e.g., by a robotically controlled machine), among others ways to alter the motor vehicle.

Altering can, in some embodiments, include altering the motor vehicle without applying a coating to the generated motor vehicle component. In such an embodiment, altering can include replacement of a motor vehicle component indicated as damaged with the generated motor vehicle component. In some embodiments, includes replacement of the motor vehicle component indicated as damaged can occur without applying a coating (e.g., primer and/or paint, etc.) to the generated motor vehicle component. That is, the motor vehicle component can be generated and/or the motor vehicle can be altered with the generated motor vehicle component without coating the generated motor vehicle component (e.g., without coating at any point prior, during, and/or after altering the motor vehicle with the generated motor vehicle component). Advantageously, defects (e.g., discrepancies between various motor vehicle components intended to have similar paint color) that may be associated with painted motor vehicle components can be avoided by generating motor vehicle components, as described herein.

Figure 3:
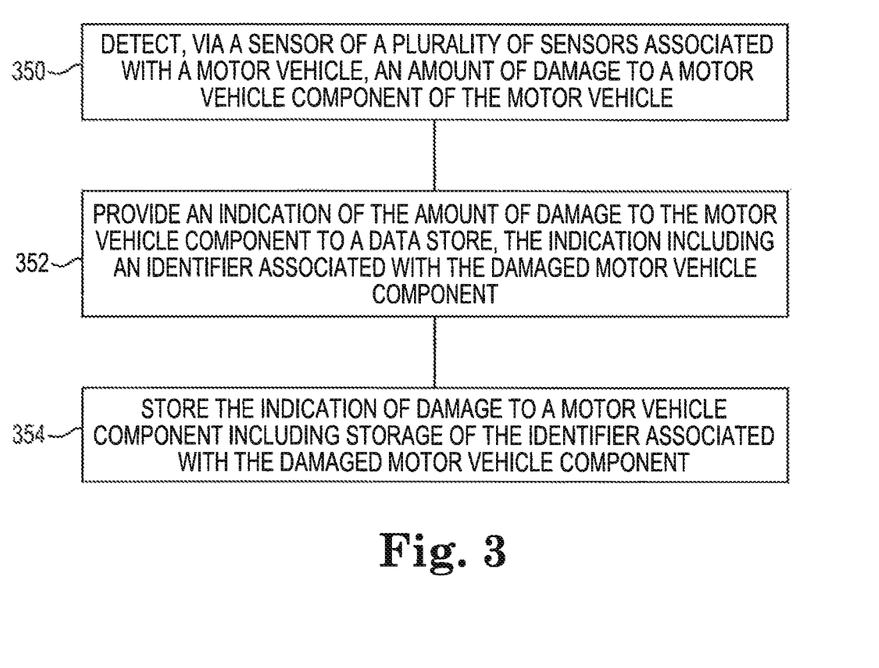
FIG. 3 illustrates a block diagram illustrating an example of instructions to detect damage according to one or more embodiments of the present disclosure.

FIG. 3 illustrates a block diagram illustrating an example of instructions to detect damage according to one or more embodiments of the present disclosure. As illustrated in block 350, the instructions can, in various embodiments, include instructions executable by a processor to detect, via a sensor of a plurality of sensors associated with a motor vehicle, an amount of damage to a motor vehicle component of the motor vehicle. In some embodiments, the instructions to detect can include instructions to detect an amount of damage to the mechanical system, such as those described herein.

In some embodiments, the instructions can include instructions executable by the processor to create a plurality of electronic models based on respective information associated with a plurality of motor vehicle components. In some embodiments, the instructions can include instructions executable by the processor to store the plurality of electronic models in a data store.

The instructions (e.g., machine readable instructions 110, as described in FIG. 1) can include instructions to provide an indication of the amount of damage to the motor vehicle component to a data store, the indication including an identifier associated with the damaged motor vehicle component, as illustrated at block 352. In some examples, an indication can provide an indication of damage to a mechanical system of a motor vehicle, for example, an indication of a detected amount of damage to the mechanical system.

As illustrated at block 354, the instructions can include instructions executable by the processor to store the indication of damage to a motor vehicle component including storage of the identifier associated with the damaged motor vehicle component. The identifier associated with the damaged motor vehicle component, such as those described herein, can be known (e.g., previously stored in the database and/or associated with the motor vehicle component) or unknown (e.g., not previously stored in the database). For an unknown component, and identifier can be generated, for instance, based on instructions such as those detailed herein and/or can be entered via a GUI by a user. Storing can, in some embodiments, include instructions to store the indication in a data store located in a mobile device. For example, a data store located in the mobile device can include an inventory of motor vehicle components in a motor vehicle including the damaged motor vehicle component and/or respective statuses associated with each of the motor vehicle components.

In some embodiments, the instructions to store can include instructions to transmit a Short Message Service (SMS) message to a mobile device, such as those described herein. Such a transmission can assist a user of a motor vehicle in discovering that damage has been detected. For example, should a motor vehicle component of a motor vehicle incur damage (e.g., be subjected to a collision) while the user of the motor vehicle is at another location such a transmission can assist the user in discovering the damage has been detected, as described herein, without the user having to be present at the same location as the motor vehicle.

In some embodiments, the instructions can include instructions to process an insurance claim based on the indication of damage. For instance, an amount of damage, detected as described herein, can correspond to an estimate cost to fix the amount of damage included in an insurance claim. Processing refers to calculation of such a cost, storage of such a cost in a database, comparing such a cost to policy information (e.g., a deductible and/or policy limits), and/or payment of such a cost (e.g., to a policyholder), among others processing acts to generally associated with an insurance claim. For example, in some embodiments, processing an insurance claim can include requesting generation of a replacement motor vehicle component (e.g., to replace a damaged motor vehicle component).

In some embodiment, the instructions can include instructions to request generation of a motor vehicle component (e.g., a 3D copy of a motor vehicle component). The request can be provided, for example, by a user of the generating machine interacting directly (e.g., inputting information for the request into a GUI of the generating machine) and/or indirectly (e.g., remotely communicating with the generating machine from another device) with the generating machine. However, the present disclosure is not so limited.

That is, the request can be provided automatically (e.g., without a user requesting generation). For example, generation of motor vehicle component can be automatically requested upon receipt of an indication of damage to a motor vehicle component and/or automatically requested based on an expected life of a motor vehicle component (e.g., upon the motor vehicle component reaching/exceeding its expected life).

The instructions can include instructions executable by the processor to receive an electronic model (e.g., a 3D electronic model), from the data store, associated with the requested motor vehicle component. For example, an electronic model can be received from the data store in response to receipt of a request, as described herein. The electronic model can, in some embodiments, be provided directly to a generating machine via a user input(s), for instance, user inputs provided to a display associated with the generating machine (e.g., a display included in generating machine and/or a display located external to the generating machine).

The instructions can include instructions executable by the processor to generate the motor vehicle component using the received electronic model (e.g., using information included in a received 3D electronic model). Generation can, for example, occur in response (e.g., automatically in response) to receipt of an electronic model. In some embodiments, the instructions to generate include instructions to generate a motor vehicle component having electronics included therein. For example, electronics can be included in a motor vehicle component during generation of the motor vehicle component.

The instructions to generate can, in some embodiments, include instructions to generate the motor vehicle component based on an expected life of a motor vehicle component. An expected life can be specified by a manufacturer of the motor vehicle component (e.g., an OEM) and/or by an insurance provider providing insurance that covers a motor vehicle including the motor vehicle component, among other entities that may specify an expected life. For example, an expected life can be specified for each of the interior components, exterior components, non-electrical components, and/or electrical components. A generated motor vehicle component, similar to an original motor vehicle component, as described herein, can include an expected life. An expected life for a motor vehicle component can be stored in a data store. Thus, a plurality of respective expected lives can be displayed for a plurality of motor vehicle components (e.g., a plurality of motor vehicle components including a generated motor vehicle component). Advantageously, this can enable readily identifying which, if any, of the plurality of motor vehicle components are approaching (e.g., within a threshold amount of time) and/or have exceeded an expected life.

For example, the motor vehicle component can be generated upon a particular motor vehicle component exceeding an expected life associated with the particular motor vehicle component i.e., its expected life. Similarly, in some embodiments, the instructions to generate can include instructions to generate a motor vehicle component based on an indication that the motor vehicle component is within a threshold amount of time (e.g., one week) of satisfying an expected life (e.g., 7 years from a time of initial sale or installation of the motor vehicle component, etc.).

In some embodiments, the instructions to generate can include instructions executable by the processor to prioritize generation of a motor vehicle component of a plurality of motor vehicle components requested for generation. Such prioritization can promote ordered alterations of the motor vehicle with the generated motor vehicle components, for example, as specified by a procedure (e.g., an order associated with replacement of various motor vehicle components included in a particular motor vehicle), as described herein, and/or otherwise promote generating motor vehicle components.

In some embodiments, the instructions can include instructions executable by the processor to provide a procedure (e.g., a procedure included in a manual) to alter the motor vehicle using a generated motor vehicle component. A procedure refers a particular process to alter the motor vehicle using a generated motor vehicle component that is specific to a particular motor vehicle component and/or particular motor vehicle. For example, the procedure can be specific to a number of particular function(s) and/or properties (e.g., material type), etc., of a generated motor vehicle component (e.g., a 3D generated copy of a damaged motor vehicle component).

Similarly, a procedure can be specific to a make, year of manufacture of a motor vehicle, etc. For instance, the procedure can include a number of actions to be performed, for example, by an individual at a shop to replace a particular motor vehicle component (e.g., a bumper) in a particular motor vehicle (e.g., an automobile of a particular make and year of manufacture, etc.). In some embodiments, the instructions can include instructions executable by the processor to provide the procedure to a display. For example, the procedure can be provided to a GUI associated with the generating machine (e.g., a GUI included in the generating machine), a display on a handheld device (e.g., a mobile phone), a display located in a shop, and/or a display included in the motor vehicle, among other displays, to display the procedure. The procedure can be stored in a data store, such as data store 130 described with respect to FIG. 1.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense. As used herein, "a" or "a number of" used in referring to a particular thing is intended refer to one or more such things.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, if provided, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim. Rather, inventive subject matter lies in less than all features of a single disclosed embodiment. Thus, the claims, if provided, are hereby incorporated into the Detailed Description, with each claim standing on its own as a separate embodiment.

What is claimed:

1. A system for detecting damage, comprising:
   a motor vehicle including a plurality of motor vehicle components;
   a plurality of sensors to detect damage to a motor vehicle component of the plurality of motor vehicle components, the plurality of sensors including a visual sensor to detect the damage by detecting a change in a distance between two or more focal points on the motor vehicle;
   a network interface to transmit an indication of the detected damage, the indication including an identifier associated with the damaged motor vehicle component; and
   a data store to store the indication of the detected damage.

2. The system of claim 1, wherein the indication of the detected damage includes a total loss status of the motor vehicle based on a determination that a cost associated with repair or replacement of the plurality of motor vehicle components with damage meets or exceeds a threshold value.

3. The system of claim 1, wherein the plurality of sensors includes at least one sensor located within the motor vehicle and at least one sensor in a building housing external to the motor vehicle.

4. The system of claim 1, wherein the data store is located within the motor vehicle that includes the motor vehicle component indicated as damaged.

5. The system of claim 1, wherein the data store includes respective information to generate each of a plurality of external motor vehicle components included in the motor vehicle, and
   wherein transmission of the indication including the identifier associated with the damaged vehicle component causes an electronic model associated with the damaged vehicle components to be provided to a generating machine to generate a replacement for the damaged vehicle component.

6. The system of claim 1, wherein the data store includes respective information identifying a manufacturer of each of the plurality of motor vehicle components included in the motor vehicle.

7. The system of claim 1, further comprising an electromagnetic frequency sensor among the plurality of sensors to detect an electromagnetic frequency change associated with a shape of the motor vehicle component to detect the damage based on an altered shape of the motor vehicle component caused by the damage.

8. The system of claim 5, the electronic model includes a mathematical representation of the damaged vehicle components and one or more of an identifier, an expected life, a status, a type of material, specifications, or an indicator of a presence of electronics embedded within the damaged vehicle components.

9. The system of claim 1, wherein the two or more focal points are located on an exterior of the motor vehicle.

10. A non-transitory computer-readable medium storing instructions executable by a processor to:
    detect, via a plurality of sensors associated with a motor vehicle, an amount of damage to a motor vehicle component of the motor vehicle, the plurality of sensors including a visual sensor to detect the damage by detecting a change in a distance between two or more focal points on the motor vehicle;
    provide an indication of the amount of damage to the motor vehicle component to a data store, the indication including an identifier associated with the damaged motor vehicle component; and
    store the indication of damage to a motor vehicle component including storage of the identifier associated with the damaged motor vehicle component.

11. The medium of claim 10, wherein the plurality of sensors further includes an accelerometer, an airbag deployment sensor, a material sensor, and a visual sensor.

12. The medium of claim 11, wherein the motor vehicle component is a mechanical system of a motor vehicle and wherein the instructions to detect include instructions to detect an amount of damage to the mechanical system.

13. The medium of claim 11, wherein the instructions to store include instructions to store the indication in a data store located in a mobile device, and wherein the data store located in the mobile device includes an inventory of motor vehicle components including the damaged motor vehicle component.

14. The medium of claim 10, wherein the instruction to store include instructions to transmit a Short Message Service message to a mobile device of a user of the motor vehicle, the message notifies the user of the motor vehicle of damage while the user is at a different location than the motor vehicle.

15. A method for detecting damage, comprising:
    detecting, via a plurality of sensors associated with a motor vehicle, an amount of damage to a motor vehicle component of the motor vehicle, the plurality of sensors includes at least a visual sensor to detect the damage by detecting a change in a distance between two or more focal points on the motor vehicle;
    providing an indication of an amount of damage to the motor vehicle component to a data store, the indication including an identifier that identifies an electronic model associated with the damaged motor vehicle component; and
    processing an insurance claim based on the amount of damage to the motor vehicle component.

16. The method of claim 15, further comprising causing generation of the motor vehicle component sensed to be damaged.

17. The method of claim 16, the motor vehicle component is generated without applying a coating.

18. The method of claim 16, further comprising prioritizing generation of the motor vehicle component, where a plurality of components are to be generated, based on an order associated with replacement of motor vehicle components.

19. The method of claim 15, further comprising:
    determining an additional motor vehicle component within a threshold amount of time of an expected life; and
    causing generation of the additional motor vehicle component based on the determination that it is within the threshold amount of time of the expected life.

20. The method of claim 15, the plurality of sensors further includes an accelerometer, an airbag deployment sensor, a material sensor, or a visual sensor.

* * * * *